March 22, 1927.
R. M. PIERSON
1,622,048
METHOD OF MAKING AN ANNULAR LAMINATED DISK LIKE ELEMENT
Filed Oct. 25, 1923
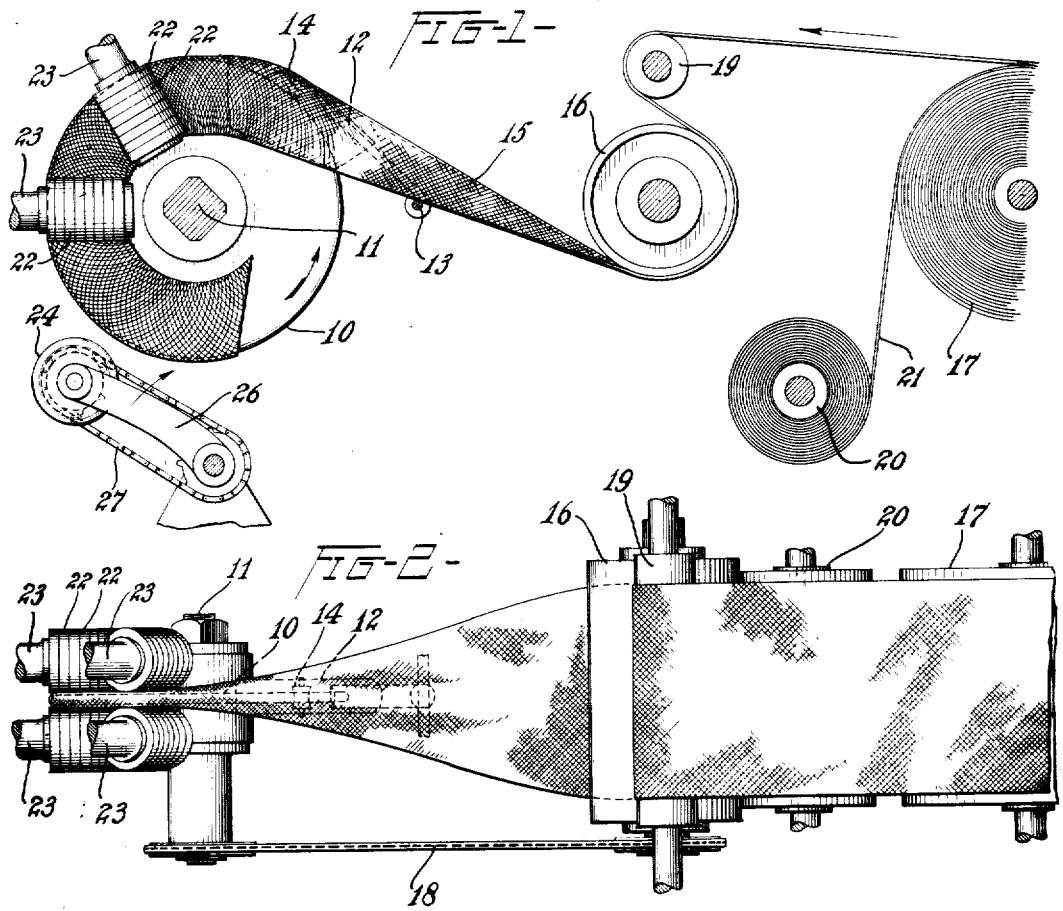
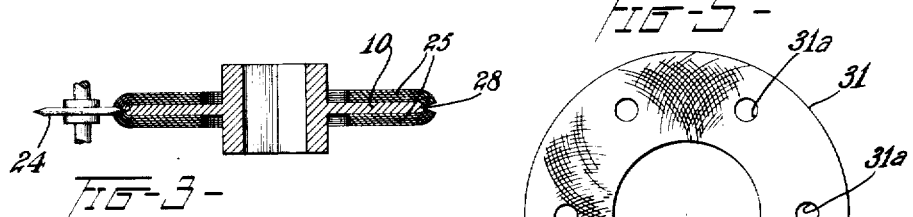
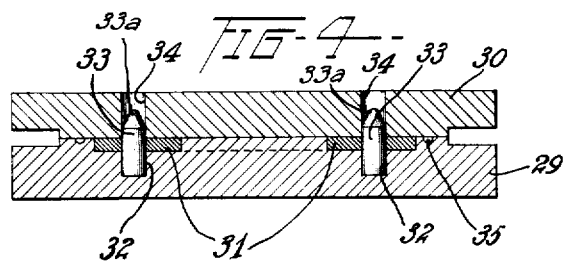
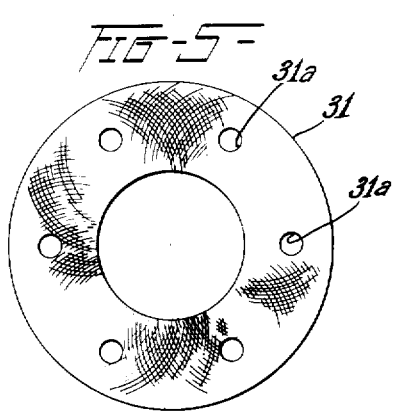
Inventor
Robert M Pierson Patented Mar. 22, 1927.

1,622,048

UNITED STATES PATENT OFFICE.

ROBERT M. PIERSON, OF AKRON, OHIO, ASSIGNOR TO THE B. F. GOODRICH COMPANY, OF NEW YORK, N. Y., A CORPORATION OF NEW YORK.

METHOD OF MAKING AN ANNULAR LAMINATED DISKLIKE ELEMENT.

Application filed October 25, 1923. Serial No. 670,778.

This invention relates to annular, disklike articles and methods of making the same, and more particularly to annular disks formed of fabric layers secured together by a binder such as rubber. Annular, rubberized-fabric disks have heretofore been used, for example. as flexible coupling elements in universal joints for power transmission, as in the universal joints of automobiles, one or more such disks being interposed between a pair of spiders secured upon adjacent ends of respective shafts, and the arms of each spider being angularly positioned in alternation with those of the other and secured, in spaced relation, to the flexible disk or disks.

Heretofore, so far as I am aware, the disks used in such joints or in like situations have been so constructed and mounted as to cause a substantial part of the strength-giving threads or strands in the disk to lie as nearly as possible parallel with a line, constituting a line of force in operation, extending from one to another of the elements to which the disk is attached. Various elaborate and expensive methods of making and mounting the disks have been devised to provide this arrangement, the thought apparently being that such disposition of strength-giving strands is essential to operative strength and durability in the assembly. I have found that such arrangement of the strands is not of great importance, and that many advantages, both in the procedure of making the disk and in its performance, may be obtained by departing from such arrangement. My invention is not limited in all of its aspects, however, to such departure.

General objects of my invention are to provide an improved, laminated, annular disk suitable for use as a universal-joint coupling disk and for other uses, wherein the strands may be so disposed as to provide strength in conjunction with flexibility or elasticity of the disk in use, and to provide improved and economical procedure and apparatus for making such disks. A more specific object is to provide a disk having strength-giving strands disposed in substantially the same relation to the disk's radius at all positions throughout the circle, so that when the disk is used as an element of a universal joint, for example, the relation of its strands to the several spider arms will be uniform throughout the series, one advantage of such uniformity being that it avoids excessive inequality in the loads sustained by different parts of the disk such as occurs when the disk is more yielding in one part, or in one direction of applied force, than it is in another. Other more specific objects are to avoid waste of material, to provide a method whereby the disk may be formed by a simple and direct winding operation which may be continuous and uniform throughout the making of a disk, and to provide improved apparatus adapted for such operation.

With these objects in view, my invention comprises producing an annular, laminated structure, as by winding upon a form a strip of bias-cut fabric or similar material, preferably associated with a binder such as unvulcanized rubber before the winding thereof, in such manner as to provide a non-cylindrical structure approximating the form desired in the finished article, and then fixing or setting said structure in its final form, as by flexing or molding it to shape and vulcanizing it, in the case of a rubberized fabric or similar structure. The word fabric, as used herein, is intended to include weak-wefted of weftless rubberized fabric as well as square-woven fabric, and my invention is applicable to disks composed of impregnated fibrous material of other types, such as felted, rubber-impregnated stock, with substantial advantage in that such "grain" as may be present in the stock due to the manner of its preparation may be uniformly disposed in desirable angular relation to the radii of the disk.

Of the accompanying drawings:

Fig. 1 is a diagrammatic vertical section of apparatus embodying and adapted to carry out my invention in a preferred form.

Fig. 2 is a plan view of the same.

Fig. 3 is a plan view of a rotary cutter showing its relation to a winding form and the work thereon, said form and the work being shown in section.

Fig. 4 is a cross-section of a vulcanizing mold and the work therein.

Fig. 5 is an elevation of the finished product as adapted for use as a universal joint coupling disk.

Referring to the drawings, 10 is a winding form secured upon a supporting and driving shaft 11, the work-receiving part of the form here shown consisting of a thin, peripherally crowned annular flange, which is of uniform thickness, so that its opposite faces lie in respective parallel planes, although I do not wholly limit myself to this relation of said faces. 12 is a fabric shaper or stretching shield of inverted U-shape in cross-section, said shield being pivotally mounted at 13 upon a fixed support and provided with a waisted supporting roller 14 journaled between the side portions of the U-shaped shield and adapted to ride upon the periphery of the form 10 to support the shield in straddling relation thereto, with the terminal margin of the shield just out of contact with the crown of the form. Said shield is thus adapted to pre-shape a bias-cut strip of rubberized fabric 15 to fit over the crown and against the side faces of the form as said strip is drawn onto the form, by rotation of the latter, from a hold-back stretching drum 16 mounted between the form and a source of fabric supply such as a journaled stock-roll 17, said stretching drum being of such relative size and having such driving connection with the form, through a sprocket chain 18 (Fig. 2), as to be held to a slower peripheral speed than that of the crown of the form, so as to stretch the middle portion of the strip onto the form, but preferably about the same speed as the radially inner portions of the form's work-receiving faces, so as to permit the side margins of the strip to be drawn onto said portions of the form without appreciable stretch. 19 is a guide roll adapted to cause the fabric strip to pass onto the stretching drum at such position as to contact the latter throughout a substantial part of its orbit, in order to prevent slippage of the fabric on the drum, and 20 is a re-winder roll for a liner 21 with which the stock is interwound in the stock-roll 17.

For pressing successive convolutions of the fabric strip 15 against the side faces of the form 10 and against each other, to compact them in a laminated structure, pressing devices, preferably backed by springs (not shown), are mounted on each side of the form, each of said devices comprising a plurality of narrow rollers 22, 22, freely journaled, closely adjacent each other, upon a shaft 23 disposed radially of the form, said rollers thus being adapted to press the fabric strip substantially throughout its width and to be driven by their contact with the work at the different peripheral speeds corresponding to their several positions. It will be understood that other forms of side-pressing, stitching or forming tools and other means of preshaping the fabric may be employed.

A rotary cutter 24 is provided for circumferentially slitting the built-up, laminated fabric structure, shown at 25 in Fig. 3, to permit its removal from the form as a pair of annular disks, said cutter being journaled upon the free end of a pivoted arm 26 adapted to be swung from and toward the form, and said cutter preferably being provided with high-speed driving means of its own, as represented by the sprocket chain 27. To assure proper alignment of the cutter for accurate cutting of the work, and to avoid dulling of the blade, the periphery of the form 10 may be circumferentially grooved, as shown at 28 (Fig. 3), to receive the edge of the blade, the latter not requiring a backing member to cut against when provided with its own high-speed driving means as described.

A mold suitable for shaping and vulcanizing one of the severed halves of the laminated structure 25, to provide a flat, vulcanized coupling disk with bolt holes therein, is shown in Fig. 4, where 29, 30 are the lower and upper sections of a two part mold, the lower section being formed with an annular mold cavity occupied by the disk, 31, and with a plurality of bores 32, 32 extending downward from the floor of said annular mold cavity and having mounted therein respective pins or mandrels 33, 33, having tapered upper ends 33$^a$, 33$^a$, said pins being adapted to lie within and mold the walls of the bolt holes, 31$^a$, 31$^a$, which may be cut or punched in the laminated fabric blank before the latter is placed in the mold or may be formed by forcing the blank onto the tapered pins 33, as it is placed in the mold. The upper mold section, 30, is formed with apertures 34, 34 adapted to register with and snugly fit the pins 33 so as to close the mold cavity and accurately position the mold sections and pins with relation to each other. 35 is an annular overflow groove in the lower mold section.

In the preferred operation of the apparatus as here shown, the work-receiving faces of the form 10 are first coated with rubber cement, which is allowed to dry sufficiently to become tacky so as adhesively to secure the first convolution of fabric wound thereon. The leading end of the fabric strip 15 is then drawn by hand over the shield 12, and its forward margin is stuck to the cemented form, adjacent the shield, said margin being flexed laterally of the strip and stuck to the side faces as well as the crown of the form, and the middle zone of the strip preferably being so stretched in the reaches thereof extending between the stretching drum 16 and the shield 12, and between the latter and the form 10 as to impart thereto the same elongation of the medial zone of the strip as corresponds to the difference in the peripheral speeds of the drum and form imposed by the sprocket chain 18 when the apparatus is driven. Power is then applied to drive the form 10, drawing the fabric strip thereonto in successive convolutions, which are pressed against the form and against each other by the rollers 22, while the drum 16, held to a relatively slow peripheral speed by the sprocket chain 18, effects a uniform, progressive, longitudinal stretching of the middle zone of the fabric whereby the latter, in sliding over the shaping shield 12 is caused to be additionally stretched longitudinally in its middle zone and flexed laterally to U-shape, being thus pre-shaped, more especially at its middle zone, approximately to fit the lateral contour of the form 10.

It will be observed that the relatively great stretching of the middle zone is effected by the greater peripheral speed of the crown of the form, which pulls forward said middle zone, as compared with the inner parts of the form, which receive and pull forward said side margins. The shield 12, by reason of its form and position and the relatively great tension imparted to the middle zone of the strip by the relatively high speed of the form's crown, engages the strip with greater frictional drag at the middle zone than at the margins, and thus effects a localized stretching of the strip's middle zone immediately adjacent the latter's point of application to the form. In so stretching and pre-shaping the middle zone of the strip just prior to the latter's passing onto the form, the shield 12, by its frictional engagement with said middle zone, prevents the pull of the form's crown from setting up such oblique stresses in the reach of fabric anterior to the shield as unduly to stretch the side margins of the strip and thus require them to be greatly re-shortened, with consequent buckling, as they pass onto the form. With the peripheral speed of the inner margins of the form's work-receiving faces approximating that of the stretching drum, it will be seen that the side margins of the fabric strip may be drawn onto the form without being greatly stretched, the stretch of the middle zone being localized at its point of application, where all oblique lines of force running to the side margins are disposed at such obtuse angles to the edges of the strip as not to be effective substantially to elongate said margins, while the lines of force disposed more nearly parallel with the length of the strip are of little effect anterior to the shield because of the relatively great snubbing effect of the latter's crown portion. It will thus be seen that, as defined in certain of the appended claims, I effect a bending of each half of the fabric strip substantially in its own plane by winding it onto a non-cylindrical face of a form and, by hold-back or tensioning engagement with the strip substantially at its point of application to the form, imparting thereto a stretch which in degree is progressive laterally of the strip.

The laminated, transversely U-shaped structure 25, as shown in Fig. 3, being thus built up on the form, the fabric strip is severed approximately at its point of application and said structure is circumferentially slit at its crown, as shown in Fig. 3, by means of the cutter 24, whereby two moldable disk blanks are produced. I do not wholly limit myself to a single cut at the crown, however, as in some instances it may be desirable to eliminate the more sharply curved portion at the outer periphery of the blank by cutting it off, either before or after removing the structure from the form.

The form 10 may be removed from its spindle to permit the dismounting of both of said blanks therefrom. Said blanks preferably are then detached from the form and molded and vulcanized in the mold 29, 30, although I do not wholly limit myself to vulcanizing them apart from the form upon which they are wound. The vulcanization in this instance fixes or sets the structure in substantially the same disk-like form in which it was built up, said structure being substantially straight in segmental cross-section, that is, in the cross-section of any segment. While the preferred form is that shown, in which the disk is flat, the invention is not wholly confined to such shape. The bolt holes 31$^a$, when desired, may be formed either before or during the molding operation, or may be punched or cut in the disk after vulcanization thereof. In some instances the punching of the holes, whereby the strands are merely separated instead of being severed, may be of advantage in providing a stronger anchorage of the bolts or other members mounted in the holes.

The particular finished product here shown, which may be economically produced by the method and apparatus above described, has its strength-giving strands all disposed obliquely with relation to the several lines of force in the disk, as used in a universal joint, for example, and this bias arrangement of the strands affords elasticity along the lines of force, so that an excessive strain of the strands does not result from the contemplated relative angular movement of the shafts out of alignment with each other. This is a very substantial advantage, since such relative movement of the shafts acts upon the disk, to distort it, with a very great mechanical advantage, the shafts acting as levers, and where the strands are so disposed, as in prior practice, as to be unyielding against the distorting force of such relative movement, not only is the desired free movement of the shafts interfered with, but the strains to which the strands are subjected result in rapid deterioration of the disk. The same is true with respect to relative axial movement of the shafts, where the spider arms act upon the disk with a great funicular advantage.

My improved disk is not only flexible and elastic with particular relation to the forces to which it is subjected in use, but the strands thereof are so disposed that, being embedded in and firmly bound by the rubber, substantially their full tensile strength is called into play before disruption of the disk begins, said strands individually being curved in the unstrained disk, as shown clearly in Fig. 5, and the load-sustaining parts thereof gradually straightening and swinging toward parallelism with the direct line of force as the load upon them is increased, the rubber yielding to permit such movement while at the same time binding each strand throughout such longitudinal space as to prevent slippage of the strand in the rubber. The strength of the disk may also be accounted for in part by the fact that the cords, as an incident of their straightening, tighten laterally against portions of the rubber lying between them, increasing its binding effect, so that force is transmitted from one cord to another through strains in the rubber which are largely compressive, are localized or non-cumulative, and consequently are relatively non-disruptive.

A very substantial advantage of the method described herein for making the disk is that it avoids the usual cutting waste.

My invention is susceptible of various modifications within its scope, and I do not wholly limit my claims to the specific forms thereof shown and described.

I claim:

1. The method of making a laminated, annular, substantially disk-shaped article of strand material and a binder therefor which comprises winding and pressing together in successive convolutions a sheeted strip of such material and binder whereby the wound structure is formed with an annular zone of non-cylindrical form, and fixing the material of said zone in a form such that it is substantially straight in segmental cross-section.

2. The method of making a laminated, annular, substantially disk-shaped article of fibrous material and a binder therefor which comprises winding and pressing together in successive convolutions a sheeted strip of such material and binder whereby the wound structure is formed with an annular zone of non-cylindrical form, and fixing the material of said zone in a form such that it is substantially straight in segmental cross-section.

3. The method of making a laminated, annular, substantially disk-shaped article which comprises winding and pressing together in successive convolutions a bias-cut strip of rubberized fabric whereby the wound structure is formed with an annular zone of non-cylindrical form and by vulcanization fixing the material of said zone in a form such that it is substantially straight in segmental cross-section.

4. The method of making a laminated, annular, substantially disk-shaped article which comprises so stretching a bias-cut strip of rubberized fabric onto an annular, non-cylindrical face of a support, by tensioning engagement therewith closely adjacent its point of application to said support, as to effect a localized, laterally graduated, stretching of the strip adjacent said point, whereby a longitudinal zone of said strip is shaped to a non-cylindrical, longitudinally curved condition, and fixing the material of said zone, by vulcanization, in a form such that it is substantially straight in segmental cross-section.

In witness whereof I have hereunto set my hand this 23d day of October, 1923.

ROBERT M. PIERSON.